United States Patent Office 3,487,075
Patented Dec. 30, 1969

---

3,487,075
10 - HYDROXY - 10,5 - (IMINOMETHANO) - 5H-DIBENZO[a,d]CYCLOHEPTENE - 11,13(10 - H) DIONES AND INTERMEDIATES THERETO
Martin A. Davis, Montreal, Quebec, and Thomas A. Dobson, St. Laurent, Quebec, Canada, assignors to American Home Products Corporation, New York, N.Y., a corporation of Delaware
No Drawing. Filed Dec. 28, 1966, Ser. No. 605,224
Int. Cl. C07d *41/06, 41/08;* A61k *27/00*
U.S. Cl. 260—239.3          17 Claims

ABSTRACT OF THE DISCLOSURE

There are disclosed herein a number of 12-substituted-10 - hydroxy - 10,5(iminomethano)-5H-dibenzo[a,d]cycloheptene-11,13(10-H)diones in which the substituents in position 12 include lower alkyl groups containing from 1–6 carbon atoms, the 2-phenethyl or the 3-phenylpropyl group, the cyclopropyl, cyclobutyl, or cyclopentyl group, the allyl or the 3,3-dimethylallyl group, the 2-hydroxyethyl or the 3-hydroxypropyl group, the 2-dimethylaminoethyl, 3-dimethylaminopropyl, 2-diethylaminoethyl, 3-diethylaminopropyl, 2-diisopropylaminoethyl, or the 3-diisopropylaminopropyl group, and the carbamoylmethyl or the 2-carbamoylethyl group. Those compounds have anti-convulsant, anti-bacterial, and trichromonacidal activities, and formulations for their use are also given. Furthermore, there are also disclosed the intermediates 10,11 - dihydroxy-10,5(iminomethano)-10,11-dihydro-5H-dibenzo[a,d]cyclohepten-13-one and its corresponding 12-methyl derivative, as well as a process for preparing the above compounds.

---

This invention relates to novel chemical compounds having useful biological properties, to the novel intermediates used for their preparation and to a process for preparing them. More specifically this invention relates to novel 10-hydroxy-10,5(iminomethano)-5H-dibenzo[a,d]cycloheptene-11,13(10-H)diones of the following Formula I:

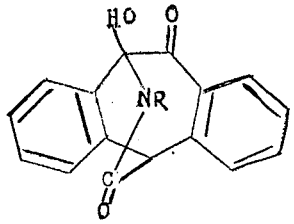

I wherein R represents hydrogen or a lower alkyl radical of from 1–6 carbon atoms, such as, for example, methyl, ethyl, propyl, butyl, pentyl, or hexyl; and aralkyl or nuclear-substituted aralkyl radical containing from 8–9 carbon atoms, such as, for example, the 2-phenylethyl or the 3-phenylpropyl group; a cycloalkyl radical containing from 3–5 carbon atoms, such as, for example, cyclopropyl, cyclobutyl, or cyclopentyl; an alkenyl radical containing from 3–5 carbon atoms, such as, for example, the allyl or the 3,3-dimethylallyl group; an hydroxyalkyl radical containing from 2–4 carbon atoms, such as, for example, the 2-hydroxyethyl or 3-hydroxypropyl group; or a disubstituted aminoalkyl radical, containing from 4–9 carbon atoms, such as, for example, the 2-dimethylaminoethyl or 3-diisopropylaminopropyl group. Furthermore, R may also represent a carbamoylalkyl group containing from 2–7 carbon atoms, such as, for example, the carbamoylmethyl group CH$_2$CONH$_2$ or the diethylcarbamoylethyl group CH$_2$CH$_2$CON(Et)$_2$. The basic compounds of this invention form salts with pharamacologically acceptable acids, and those salts are pharmacologically equivalent to the free bases.

The compounds of Formula I are prepared as follows. A solution of 10,5(epoxymethano)-5H-dibenzo[a,d]cycloheptene-11,13(10-H)dione of Formula II in a suitable solvent, such as, for example, 1,2-dimethoxyethane, dioxane, or chloroform is treated with a molar excess of ammonia or a primary organic amine of the formula RNH$_2$, wherein R is as defined above, at temperatures ranging from the boiling point of liquid ammonia to about 25° C. The reaction may be carried out under an inert, oxygen-free atmosphere by passing a slow stream of purified nitrogen or argon gas through the reaction mixture. There is thus formed a 10,11-dihydroxy-10,5-(iminomethano)-10,11-dihydro - 5H - dibenzo[a,d]cycloheptene-13-one of Formula III in which R is as defined above. This latter 10,11-dihydroxy-compound may be isolated by filtration and may be purified by recrystallization from an appropriate solvent. In order to secure the 11-keto compounds of Formula I, the corresponding compounds of Formula III are oxidized with a suitable agent, such as, for example, aqueous chromic acid at or below room temperature. This serves, in effect, to oxidize the 11-hydroxy group to an 11-keto group. Preferentially the 11-keto compounds of Formula I may be also secured directly from the reaction mixture used to prepare the intermediates III, by passing air through the reaction mixture, whereby the compounds of Formula I are obtained in good yields. As a further modification of this process, the intermediates of Formula III may also be isolated and then dissolved in a suitable solvent, for example aqueous ethanol and may then be exposed to air, whereby the compounds of Formula I may also be obtained. If desired a small amount of ammonia may be added to the reaction mixture for the purpose of accelerating the reaction.

The starting material for the compounds of this invention, namely 10,5(epoxymethano)-5H-dibenzo[a,d]cycloheptene-11,13(10-H)dione of formula is readily secured as disclosed in our copending U.S. patent application Ser. No. 551,937 filed May 23, 1966, now U.S. Patent 3,391,163. Briefly these processes entail the treatment of 5H-dibenzo[a,d]cycloheptene-5-carboxamide, prepared as described by M. A. Davis et al. in J. Med. Chem., 7, 88 (1964), with a mixture of silver acetate, iodine, acetic acid, and water to give, after processing 11-acetoxy-10,5 (epoxymethano)-10,11-dihydro - 5H - dibenzo[a,d]cycloheptene-13-one which, upon saponification yields the low-melting geometrical isomer of 11-hydroxy-10,5(epoxymethano)-10,11-dihydro - 5H - dibenzo[a,d]cyclohepten-13-one. This 11-hydroxy compound is then converted to the corresponding 11-ketone of Formula II by oxidation with an aqueous solution of chromic acid.

The novel compounds of Formula I have useful biological properties and are of value as medicaments. They have effects on the central nervous system in mammals being particularly effective in inhibiting the convulsions caused by administration of electroshock. The anti-electroshock activity of the compounds is elicited both upon injected and peroral administration and is noteworthy in being manifest at doses far below those causing signs of toxicity or neurotoxocity. Thus the compounds are useful as anticonvulsant agents which are relatively free from undesirable depressant side-effects. For this purpose the compounds may be formulated with suitable excipients for oral administration in the form of compressed tablets, capsules or as suspensions in an aqueous vehicle containing from 100 to 400 mg. of the active ingredient per unit dosage form. Such dosage forms may be given from twice to four times daily. The compounds furthermore have antibacterial effects against a number of gram-positive and gram-negative organisms such as, for example, *Staphylococcus pyogenes* (both penicillin-sensitive and penicillin-resistant strains), *Sarcina lutea, Streptococcus fecalis, Escherichia coli, Aerobacter aerogenes, Salmonella pullorum, Pseudomonas aeruginosa, Proteus mirabilis,* and *Proteus vulgaris,* and are also trichomonicidal agents, being effective against *Trichomonas vaginalis*. As anti-bacterial agents, the compounds of this invention may be formulated in the form of ointments, creams, or lotions, containing from 0.1–2.0 percent of the active ingredient, and may be applied topically. As trichomonicidal agents, they may be formulated in the form of vaginal inserts or suppositories containing from 50–500 mg. of the active ingredient per unit dosage form to be administered twice daily for periods of time of from two to several weeks.

The following formulae and descriptive examples will illustrate this invention.

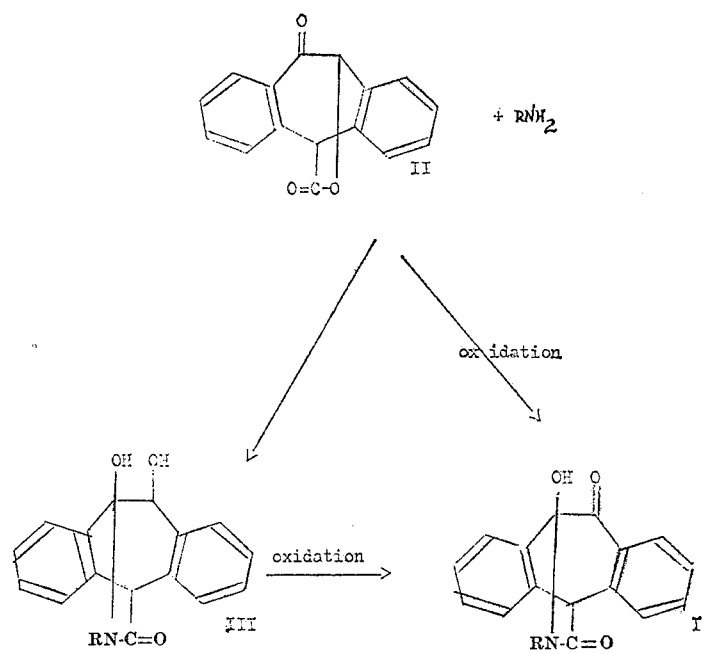

EXAMPLE 1

10,11-dihydroxy-10,5(iminomethano)-10,11-dihydro-5H-dibenzo[a,d]cycloheptene-13-one (III, R=H)

A solution of 10,5(epoxymethano)-5H-dibenzo[a,d]-cycloheptene-11,13(10-H)dione (II), (8.0 g.) in dioxane (40 ml.), is added dropwise with stirring to concentrated ammonium hydroxide (150 ml.), a slow stream of nitrogen being passed through the mixture. It is stirred at room temperature for 2 hours. The precipitate which forms is filtered off, washed with water and dried to furnish 6.0 g. of the title compound. Recrystallization from chloroform furnishes a sample M.P. 172–173° C. whose analysis confirms the empirical formula $C_{16}H_{13}NO_3$

EXAMPLE 2

10-hydroxy-10,5(iminomethano)-5H-dibenzo-[a,d]cycloheptene-11,13(10-H)dione (I, R=H)

(a) A solution of 10,5(epoxymethano)-5H-dibenzo[a,d]cycloheptene-11,13(10-H)dione (II), (10.0 g.) in dioxane (50 ml.) is added dropwise to concentrated ammonium hydroxide (200 ml.) and water (200 ml.) in an open vessel. The mixture is agitated rapidly for 4 hours and the bulk of the dioxane is then removed in vacuo. The title compound (5.0 g.) is obtained as a precipitate which is collected by filtration, dried, and recrystallized from a mixture of dioxane and ether to furnish a sample M.P. 242–243° C. Elemental analysis confirms the empirical formula $C_{16}H_{11}NO_3$ and the structure is fully corroborated by the infrared, ultraviolet and nuclear magnetic resonance spectral data.

(b) A solution of 10,11-dihydroxy-10,5(iminomethano) - 10,11-dihydro-5H-dibenzo[a,d]cyclohepten-13-one, prepared as described in Example 1, (1.0 g.) in acetone (25 ml.) is treated dropwise with 8 N chromic acid (3.0 ml.). The precipitate is filtered off and the filtrate, after removal of the solvent in vacuo is shaken with water and chloroform. The organic layer is then separated, washed with further portions of water, dried and evaporated. Recrystallization of the residue from ethanol gives a sample of the title compound M.P. 227–230° C.

(c) The 10,11-dihydroxy compound cited in (b) (3.1 g.) is dissolved in ethanol (75 ml.), and water (75 ml.), is added. The solution is kept in an open vessel for 41 hours and the bulk of the ethanol is removed in vacuo. The resulting precipitate (2.7 g.) M.P. 223–233° C., consists of the title product.

EXAMPLE 3

10,11 - dihydroxy - 12-methyl-10,5(iminomethano)-10,11-dihydro - 5H - dibenzo[a,d]cyclohepten - 13 - one (III, R=CH_3)

An ethereal solution of methylamine (100 ml.) is added dropwise to a stirred solution of 10,5(epoxymethano) - 5H - dibenzo[a,d]cycloheptene-11,13-(10-H) dione (II) (6.0 g.) in 1,2-methoxyethane (100 ml.) whilst a slow stream of argon is passed through the mixture. It is left at room temperature for 1 hour, diluted with ether (50 ml.) and the precipitated product (1.1 g.) is filtered off. Addition of hexane to the filtrate gives a further 1.5 g. of product. Recrystallization from 1,2-dimethoxyethane gives a sample of the title compound, M.P. 170–171° C. Elemental analysis confirms the empirical formula $C_{17}H_{15}NO_3$.

EXAMPLE 4

10 - hydroxy - 12 - methyl-10,5(iminomethano)-5H-dibenzo[a,d]cycloheptene-11,13-(10-H)dione (I, R=CH_3)

A solution of chloroform saturated with methylamine (150 ml.) is added to 10,5-(epoxymethano)-5H-dibenzo[a,d]cycloheptene-11,13(10-H)dione (II) (6.0 g.), dissolved in the same solvent (100 ml.). The mixture is kept in an open vessel for 2 hours and then a stream of air is passed through for 15 minutes to complete the conversion of compound III, (R=CH₃) into the desired product. The mixture is kept at room temperature overnight, concentrated in vacuo and the residue is recrystallized from ethanol to give 3.5 g. of the title product, M.P. 222–223° C. Elemental analysis confirms the empirical formula $C_{17}H_{13}NO_3$.

EXAMPLE 5

12-ethyl-10-hydroxy-10,5(iminomethano)-5H-dibenzo[a,d]cycloheptene-11,13-(10-H)dione (I, R=$C_2H_5$)

A solution of 10,5(epoxymethano)-5H-dibenzo[a,d]cycloheptene-11,13(10-H)dione (4.0 g.) in dioxane (75 ml.) is treated with aqueous ethylamine (30 ml. of 70% solution) and the mixture is kept in an open vessel for 3.5 hours. Air is then bubbled through the mixture for 5 minutes and the mixture is diluted with water. The product is taken up into chloroform, the solution concentrated in vacuo and the residue is recrystallized from absolute ethanol-hexane mixture to give 2.9 g. of the title product, M.P. 202–203° C. Elemental analysis confirms the empirical formula $C_{18}H_{15}NO_3$.

EXAMPLE 6

10-hydroxy-12-propyl-10,5(iminomethano)-5H-dibenzo[a,d]cycloheptene-11,13-(10-H)dione (I, R=$C_3H_7$)

Following the procedure described in Example 4, the keto-lactone II, (5.0 g.) and n-propylamine (2.4 g.) in chloroform (75 ml.) affords 5.2 g. of the title product, M.P. 171–172° C. when recrystallized from chloroform-hexane mixture. Elemental analysis confirms the empirical formula $C_{19}H_{17}NO_3$.

EXAMPLE 7

12-butyl-10-hydroxy-10,5(iminomethano)-5H-dibenzo[a,]cycloheptene-11,13-(10-H)dione (I, R=$C_4H_9$)

Following the procedure described in Example 4, but keeping the reaction mixture overnight, the keto-lactone II, (5.0 g.) and n-butylamine (2.9 g.) in chloroform (100 ml.), gives 3.4 g. of the title product, M.P. 128–129° C. when recrystallized from ethyl acetate-hexane mixture. Elemental analysis confirms the empirical formula $C_{20}H_{19}NO_3$.

In the same manner, but using n-pentylamine or n-hexylamine as starting materials instead of n-butylamine, 12-n-pentyl- and 12-n-hexyl-10-hydroxy-10,5(iminomethano)-5H-dibenzo[a,d]cycloheptene-11,13-(10 - H)diones are also obtained.

EXAMPLE 8

10-hydroxy-12-(2-phenethyl) - 10,5(iminomethano)-5H-dibenzo[a,d]cycloheptene - 11,13(10 - H)dione (I, R=$CH_2CH_2C_6H_5$)

Following the procedure described in Example 4 but keeping the reaction mixture overnight, the keto-lactone II, (5.0 g.) and 2-phenethylamine (5.0 g.) in chloroform (125 ml.), gives 4.2 g. of the title product, M.P. 165–166° C. when recrystallized from absolute ethanol-hexane mixture. Elemental analysis confirms the empirical formula $C_{24}H_{19}NO_3$.

In the same manner, but using 3-phenylpropylamine as starting material instead of 2-phenethylamine, 10-hydroxy - 12 - (3-phenylpropyl)-10,5(iminomethano)-5H-dibenzo[a,d]cycloheptene-11,13(10-H)dione is also obtained.

EXAMPLE 9

12 - allyl - 10 - hydroxy-10,5(iminomethano)-5H-dibenzo[a,d]cycloheptene - 11,13(10 - H)dione. (I, R=$CH_2CH=CH_2$)

Following the procedure described in Example 4 but keeping the reaction mixture overnight, the keto-lactone II, (5.0 g.) and allylamine (2.3 g.) in chloroform (75 ml.) gives 3.1 g. of the title product, M.P. 169–170° C. when recrystallized from ethyl acetate. Elemental analysis confirms the empirical formula $C_{19}H_{15}NO_3$.

In the same manner, but using cyclobutylamine or cyclo- as starting material instead of allylamine, 12-(3,3-dimethylallyl) - 10 - hydroxy-10,5(iminomethano)-5H-dibenzo[a,d]cycloheptene-11,13(10-H)dione is obtained.

EXAMPLE 10

12 - cyclopropyl - 10 - hydroxy-10,5(iminomethano)-5H-dibenzo[a,d]cycloheptene - 11,13(10 - H)dione. (I, R=cyclopropyl)

Following the procedure described in Example 4 but keeping the recation mixture overnight, the keto-lactone II (5.0 g.) and cyclopropylamine (2.3 g.) gives 3.4 g. of the title product M.P. 162–163° C. when recrystallized from ethyl acetate-hexane mixture. Elemental analysis confirms the empirical formula $C_{19}H_{15}NO_3$.

In the same manner, but using cyclobutylamine or cyclopentylamine as starting materials instead of cyclopropylamine, 12-cyclobutyl- and 12-cyclopentyl-10-hydroxy-10,5(iminomethano) - 5H - dibenzo[a,d]cycloheptene-11,13(10-H)diones are also obtained.

EXAMPLE 11

10 - hydroxy - 12 - (2-hydroxyethyl)-10,5-(iminomethano) - 5H - dibenzo[a,d]cycloheptene-11,13-dione (I, R=$CH_2CH_2OH$)

A solution of the keto-lactone II, (5.0 g.) and 2-aminoethanol (2.5 g.) in chloroform (125 ml.) is kept overnight in an open vessel. The solution is then extracted with several portions of water in order to remove the excess of amine, and is then dried and concentrated in vacuo. Recrystallization from ethyl acetate affords 4.4 g. of the title product M.P. 179–180° C. Elemental analysis confirms the empirical formula $C_{18}H_{15}NO_4$.

In the same manner, but using 3-aminopropanol as starting material instead of 2-aminoethanol, 10-hydroxy-12-(3-hydroxypropyl) - 10,5(iminomethano) - 5H - dibenzo[a,d]cycloheptene-11,13-dione is obtained.

EXAMPLE 12

12 - (2 - dimethylaminoethyl) - 10 - hydroxy - 10,5 - (iminomethano) - 5H - dibenzo[a,d]cycloheptene - 11,13-(10 - H)dione [I, R=$CH_2CH_2N(CH_3)_2$]

Following the procedure described in Example 11, but keeping the reaction mixture for two days, the keto-lactone II, (5.0 g.) and N,N-dimethylaminoethylamine (3.6 g.) in chloroform (100 ml.), affords 5.3 g. of the title product, M.P. 164–166° C. on recrystallization from ethyl acetate. A different crystal form, M.P. 156–157° C. is also obtained which on melting and cooling reverts to the higher M.P. form. Elemental analysis confirms the empirical formula $C_{19}H_{20}N_2O_3$.

In the same manner, but using 3-dimethylaminopropylamine, 2-diethylaminoethylamine, 3-diethylaminopropylamine, 2-diisopropylaminoethylamine, or 3-diisopropylamine as starting materials instead of 2-dimethylaminoethylamine, the corresponding 12-(3-dimethylaminopropyl, 12 - (2 - diethylaminoethyl) - , 12 - (3 - diethylaminopropyl)-, 12-(2-diisopropyl(aminoethyl)-, and 12-3 - diisopropyl - aminopropyl) - 10 - hydroxy - 10,5(iminomethano) - 5H - dibenzo[a,d]cycloheptene - 11,13(10-H)diones are also obtained.

EXAMPLE 13

12-carbamoylmethyl-10,5(iminomethano)-5H-dibenzo[a,d]cycloheptene-11,13(10-H)dione
(I, R=$CH_2CONH_2$)

A solution of the keto-lactone II, (1.0 g.), glycinamide hydrochloride (0.9 g.) and sodium bicarbonate (0.66 g.) in water (15 ml.), and dioxane (30 ml.), is stirred and heated between 50 and 80° C. for seven hours; the reaction mixture is kept exposed to the air throughout and is then left overnight at room temperature. Water is added and the mixture is extracted with chloroform. Evaporation of the solvent and recrystallization of the residue from ethanol or acetonitrile gives 0.4 g. of the title product, M.P. 211–213° C. (dec.). Elemental analysis confirms the empirical formula $C_{18}H_{14}N_2O_4$.

In a similar manner but using β-alanine amide in place of the glycinamide as starting material, there is obtained 12 - (2 - carbamoylethyl) - 10 - hydroxy - 10,5 - (iminomethano) - 5H - dibenzo[a,d]cycloheptene - 11,13(10-H)-dione.

We claim:
1. A compound selected from the group consisting of compounds of the formula:

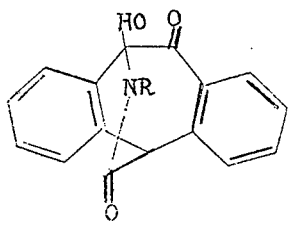

wherein R is selected from the group which consists of hydrogen, lower alkyl, hydroxyalkyl containing from two to four carbon atoms, alkenyl containing from three to five carbon atoms, 2-dimethylaminoethyl, 2-diethylaminoethyl, 3-dimethylaminopropyl, 2-diisopropylaminoethyl, carbamoylalkyl containing from two to seven carbon atoms, phenethyl, phenylpropyl and cycloalkyl containing from three to five carbon atoms; and salts thereof with pharmacologically acceptable acids.

2. Compounds of the formula:

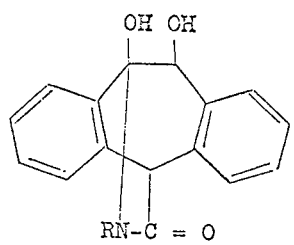

wherein R is selected from the group which consists of hydrogen, lower alkyl, hydroxyalkyl containing from two to four carbon atoms, alkenyl containing from three to five carbon atoms, 2-dimethylaminoethyl, 2-diethylaminoethyl, 3-dimethylaminopropyl, 2-diisopropylaminoethyl, carbamoylalkyl containing from two to seven carbon atoms, phenethyl, phenylpropyl and cycloalkyl containing from three to five carbon atoms.

3. 10 - hydroxy - 10,5(iminomethano) - 5H - dibenzo[a,d]cycloheptene - 11,13(10 - H)dione, as claimed in claim 1.

4. 10 - hydroxy - 12 - methyl - 10,5(iminomethano)-5H - dibenzo[a,d]cycloheptene - 11,13(10 - H)dione, as claimed in claim 1.

5. 12 - ethyl - 10 - hydroxy - 10,5(iminomethano)-5H - dibenzo[a,d]cycloheptene - 11,13(10 - H)dione, as claimed in claim 1.

6. 10-hydroxy-12-propyl-10,5(iminomethano)-5H - dibenzo[a,d]cycloheptene-11,13(10-H)dione, as claimed in claim 1.

7. 12-butyl-10-hydroxy-10,5(iminomethano) - 5H - dibenzo[a,d]cycloheptene-11,13(10-H)dione, as claimed in claim 1.

8. 10-hydroxy-12-(2-phenethyl) - 10,5(iminomethano)-5H - dibenzo[a,d]cycloheptene - 11,13(10 - H)dione, as claimed in claim 1.

9. 12-allyl-10-hydroxy-10,5(iminomethano) - 5H - dibenzo[a,d]cycloheptene-11,13(10-H)dione, as claimed in claim 1.

10. 12-cyclopropyl-10-hydroxy - 10,5(iminomethano)-5H-dibenzo[a,d]cycloheptene - 11,13(10 - H)dione, as claimed in claim 1.

11. 10-hydroxy-12-(2-hydroxyethyl) - 10,5 - (iminomethano)-5H-dibenzo[a,d]cycloheptene-11,13(10 - H)dione, as claimed in claim 1.

12. 12-(2-dimethylaminoethyl) - 10 - hydroxy - 10,5 (iminomethano)-5H-dibenzo[a,d]cycloheptene - 11,13(10-H)dione, as claimed in claim 1.

13. 12-carbamoylmethyl - 10 - hydroxy - 10,5(iminomethano)-5H-dibenzo[a,d]cycloheptene-11,13(10 - H)dione, as claimed in claim 1.

14. 10,11-dihydroxy-10,5(iminomethano)-10,11 - dihydro-5H-dibenzo[a,d]cyclohepten-13-one, as claimed in claim 2.

15. 10,11-dihydroxy-12-methyl - 10,5(iminomethano)-10,11-dihydro-5H-dibenzo[a,d]cyclohepten - 13 - one, as claimed in claim 2.

16. The process which comprises treating 10,5-(epoxymethano)-5H-dibenzo[a,d]cycloheptene-11,13(10 - H)dione with a molar excess of a reagent of formula $RNH_2$ wherein R is selected from the group which consists of hydrogen, lower alkyl, hydroxyalkyl containing from two to four carbon atoms, alkenyl containing from three to five carbon atoms, 2-dimethylaminoethyl, 2-diethylaminoethyl, 3-dimethylaminopropyl, 2-diisopropylaminoethyl, carbamoylalkyl containing from two to seven carbon atoms, phenethyl, phenylpropyl and cycloalkyl containing from three to five carbon atoms, said treatment being carried out in an inert, oxygen-free atmosphere at a temperature ranging from about the boiling point of liquid ammonia to about 25° C., thereby obtaining a compound of formula:

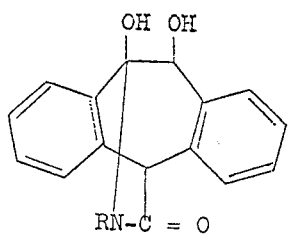

R being as above defined; and then oxidizing said lastnamed compound by treatment thereof with an oxidizing agent, thereby securing a compound of formula:

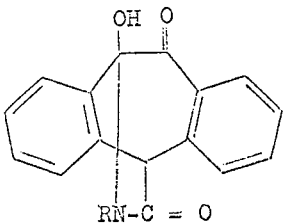

R being as above defined.

17. The process which comprises treating 10,5(epoxymethano)-5H-dibenzo[a,d]cycloheptene-11,13(10-H)dione with a molar excess of a reagent of formula $RNH_2$ wherein R is selected from the group which consists of hydrogen, lower alkyl, hydroxyalkyl containing from two to four carbon atoms, alkenyl containing from three to five carbon atoms, 2-dimethylaminoethyl, 2-diethylaminoethyl, 3-dimethylaminopropyl, 2-diisopropylaminoethyl, carbamoylalkyl containing from two to seven carbon atoms, phenethyl, phenylpropyl and cycloalkyl containing from three to five carbon atoms, said treatment being carried out at a temperature ranging from about the boiling point of liquid ammonia to about 25° C. and passing air simultaneously through the reaction mixture, thereby obtaining a compound of formula

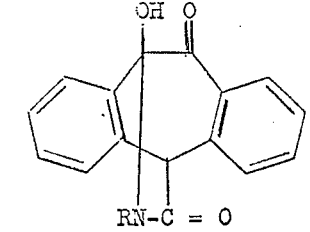

R being as above defined.

UNITED STATES PATENTS
References Cited 3,412,085  11/1968  Dobson et al. _____ 260—239.3

HENRY R. JILES, Primary Examiner

R. T. BOND, Assistant Examiner

PO-1050
(5/69)

UNITED STATES PATENT OFFICE
CERTIFICATE OF CORRECTION

Patent No. 3,487,075　　　　　　　　　Dated December 30, 1969

Inventor(s) Martin A. Davis and Thomas A. Dobson

It is certified that error appears in the above-identified patent and that said Letters Patent are hereby corrected as shown below:

Column 6, line 4, the words cyclobutylamine or cycloshould read:　3,3-dimethylallylamine Column 6, line 57, the words 3-diisopropylshould read:　3-diisopropylaminopropyl Column 6, title of Example 13, is incomplete should read:　12-carbamoylmethyl-10-hydroxy-10,5
　　　　　　　　(iminomethano)-5H-dibenzo[a,d]
　　　　　　　　cycloheptene-11,13 (10-H)dione

SIGNED AND
SEALED
JUL 28 1970

(SEAL)
Attest:

Edward M. Fletcher, Jr.
Attesting Officer

WILLIAM E. SCHUYLER, JR.
Commissioner of Patents